M. B. DYOTT.
Lamp.
No. 55,075.
Patented May 29, 1866.
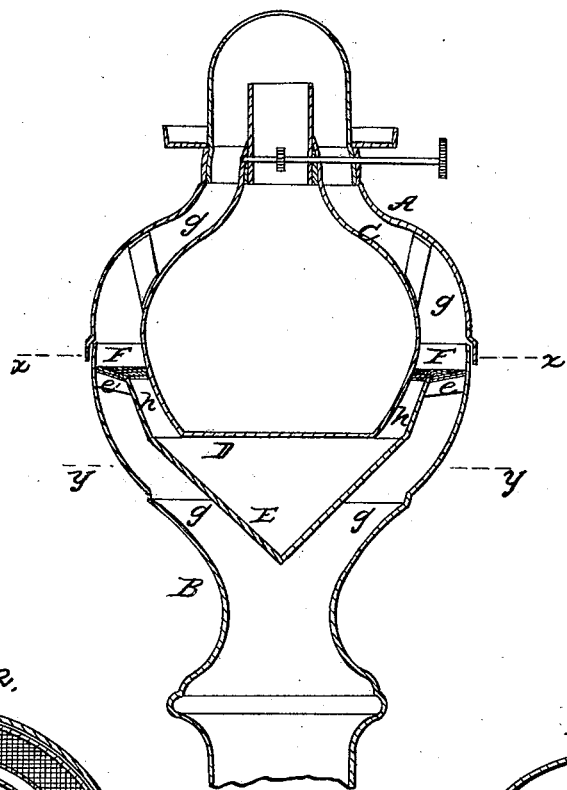
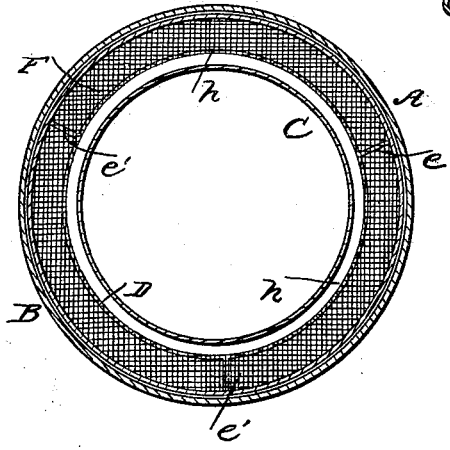
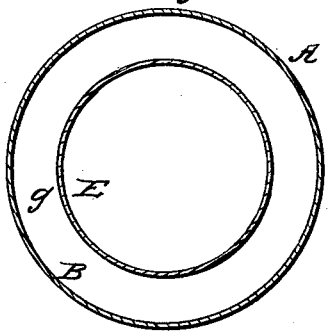
Witnesses:
Inventor:
Michael B Dyott

UNITED STATES PATENT OFFICE.

MICHAEL B. DYOTT, OF PHILADELPHIA, PENNSYLVANIA.

IMPROVEMENT IN LAMPS.

Specification forming part of Letters Patent No. 55,075, dated May 29, 1866.

*To all whom it may concern:*

Be it known that I, MICHAEL B. DYOTT, of the city of Philadelphia, in the State of Pennsylvania, have invented a new and useful Improvement in Lamps; and I do hereby declare that the following is a full, clear, and exact description of the construction and operation of the same, reference being had to the accompanying drawings, making a part of this specification, in which—

Figure 1 is a vertical central section of the upper portion of a coal-oil lamp having my improvement applied thereto; Fig. 2, a horizontal section on the dotted line $x$ of Fig. 1, and Fig. 3 a like section on the dotted line $y$ of the same figure, like letters of reference indicating the same parts when in the different figures.

My improvement relates to that class of coal-oil lamps which have a continuous current of air propelled upward through them to the flame by mechanical means, as patented by De Keravanus, but more especially to the same as improved by G. A. Jones, and patented November 10, 1863; and my improvement has for its object the protection of the propelling apparatus from any access thereto of the oil which, from the capillary attraction of the wick, or from the accidental overflowing of the oil in filling the lamp, necessarily runs down over the bowl and drips upon the propeller, and also the arrest of the falling trimmings of the wick at a point high enough to cause them to fall into the protector.

My invention consists, substantially as hereinafter described and specified, in the construction and arrangement of a conical-bottomed hollow vessel beneath the bowl and within the shell or outer case of the said lamp, in such manner that it will serve the double purpose of a drip-cup and an equalizing spreader or deflector of the current of air driven upward by the propeller below, and also in the arrangement of the wire-gauze screen horizontally around between the bowl of the lamp and the outer case or shell and above the drip-cup, as hereinafter described, for the double purpose of increasing its foraminous area for the passage of the current of air through it, and turning the falling wick-trimmings into the said drip-cup.

In the drawings, A B is the shell or outer case of the lamp; C D, the bowl or oil-reservoir; E, the drip, and F the screen.

The bowl as well as the shell of these lamps has heretofore been made of sheet metal, and for the purpose of causing the propelled air to spread and pass over the whole outer side of the bowl to the flame instead of passing through the middle of the bowl, as in De Keravanus's patent, the bowl has been suspended from the shell, so as to leave a free space, $g$, entirely around and beneath the bowl, and also the bottom of the bowl made conical, with its apex downward, for the purpose of deflecting or spreading the upward current of air uniformly around the bowl, and consequently any of the oil which at any time reached the outer side of the said bowl would necessarily run down to the point or apex of the cone, and from thence drip down into the propelling apparatus and stop, if not ruin, the latter. To prevent this result I remove the cone from the bottom of the lamp-bowl, and arrange it entirely below and separate from the bowl C D, as a drip, E, in the form of a hollow cone of sheet metal, open at its base, and supported directly beneath the bowl C D by means of the fins $e'\, e'\, e'$ or otherwise, so as to present its apex or point downward in the center of the hollow stem of the shell, and so as to leave the free space $g\, g$ around and between it and the opposite sides of the shell for the passage of the propelled air upward, as heretofore, and also a free space, $h\, h$, between it and the bowl C D, so that any oil running down over the outside of the said bowl will fall into the said drip E.

The outside of the drip E serves also as a deflector or spreader of the current of propelled air, as heretofore, and it may be either permanently fixed to the shell, as seen in the drawings, or detached, so that it may be readily lifted out if required.

The bowl C D may therefore have a flat bottom, as shown in Fig. 1, so that when lifted out of the lower part of the shell and set upon a table, or other horizontal plane, it will support itself in an upright position thereon, and, being detached or separate from the drip E, the said bowl can be made of glass, which is of importance, as affording a better view of the amount of oil it may at any time contain.

It will be seen that the drip E will effectually protect the usual air-propelling apparatus from oil, and at the same time spread or deflect the current of air uniformly around over the bowl as it is propelled upward to the flame.

The screen F, for preventing the trimmings of the wick from falling down into the propelling apparatus, (not shown in the drawings,) is simply a flat ring of wire-gauze covering the large annular space which is between the upper edge of the drip E and the opposite sides of the shell A B, and thus preventing the trimmings of the wick from reaching the propelling apparatus without impairing the passage of the upward current of air, and at the same time permitting the said trimmings to fall into the drip, from whence they can at any time be readily emptied out with the oil which may from time to time be caught thereby.

I do not desire to claim, broadly, the application of a drip-cup to a lamp; but,

Having thus fully described my improvement and pointed out its utility, what I claim as new therein of my invention, and desire to secure by Letters Patent, is—

1. The air-deflecting drip-cup E, constructed and arranged so as to operate in combination with the bowl C D and the shell A B of a lamp, substantially as and for the purposes described.

2. The combination of the screen F with the said drip E and the opposite sides of the shell A B, substantially as and for the purposes described.

MICHAEL B. DYOTT.

Witnesses:
BENJ. MORISON,
JAS. WINSMORE,
JOHN WHITE.